(12) United States Patent
Zhao et al.

(10) Patent No.: US 12,739,805 B2
(45) Date of Patent: *Sep. 15, 2026

(54) METHOD AND APPARATUS FOR DETERMINING TIME DOMAIN RESOURCE, AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 168 days.

This patent is subject to a terminal disclaimer.

(21) Appl. No.: 18/917,852

(22) Filed: Oct. 16, 2024

(65) Prior Publication Data

US 2025/0048343 A1 Feb. 6, 2025

Related U.S. Application Data

(63) Continuation of application No. 17/675,139, filed on Feb. 18, 2022, now Pat. No. 12,160,853, which is a continuation of application No. PCT/CN2020/074765, filed on Feb. 11, 2020.

(51) Int. Cl.
*H04W 72/0446* (2023.01)

(52) U.S. Cl.
CPC ............................... *H04W 72/0446* (2013.01)

(58) Field of Classification Search
CPC ... H04W 72/0446; H04W 4/46; H04W 92/18; H04W 72/02; H04W 4/40; H04W 72/20; H04L 5/0053; H04L 5/0094
See application file for complete search history.

(56) References Cited

U.S. PATENT DOCUMENTS

| | | | | |
|---|---|---|---|---|
| 2017/0295601 | A1* | 10/2017 | Kim | H04W 72/20 |
| 2017/0303291 | A1* | 10/2017 | Chae | H04W 72/12 |
| 2017/0339679 | A1* | 11/2017 | Lee | H04W 72/0446 |
| 2018/0098322 | A1* | 4/2018 | Yoon | H04W 72/23 |
| 2018/0220388 | A1 | 8/2018 | Chae | |
| 2019/0020440 | A1 | 1/2019 | Santhanam | |

(Continued)

FOREIGN PATENT DOCUMENTS

| | | | |
|---|---|---|---|
| CA | 3098633 | A1 | 11/2019 |
| CN | 105992331 | A | 10/2016 |

(Continued)

OTHER PUBLICATIONS

Supplementary European Search Report in the European application No. 20918791.3, mailed on Jun. 6, 2023, 11 pages.

(Continued)

*Primary Examiner* — Afshawn M Towfighi
(74) *Attorney, Agent, or Firm* — BAYES PLLC

(57) ABSTRACT

Provided are a method and apparatus for determining a time domain resource and a terminal device. The method includes: determining, by a terminal device, a first time slot set in a first period; and selecting, by the terminal device, time slots from the first time slot set based on a first bitmap, the selected time slots forming the time domain resource of a resource pool.

20 Claims, 8 Drawing Sheets

(56) References Cited

U.S. PATENT DOCUMENTS

| | | | | |
|---|---|---|---|---|
| 2019/0159216 | A1* | 5/2019 | Sun | H04W 72/541 |
| 2019/0174491 | A1* | 6/2019 | Lu | H04W 72/0446 |
| 2019/0327732 | A1* | 10/2019 | Yoon | H04L 5/0094 |
| 2020/0045674 | A1* | 2/2020 | Tseng | H04W 76/14 |
| 2020/0154384 | A1 | 5/2020 | Chae | |
| 2020/0288471 | A1 | 9/2020 | Yoon | |
| 2021/0176720 | A1 | 6/2021 | Chae | |

FOREIGN PATENT DOCUMENTS

| | | | |
|---|---|---|---|
| CN | 106464703 | A | 2/2017 |
| CN | 107852685 | A | 3/2018 |
| CN | 108024338 | A | 5/2018 |
| CN | 108076525 | A | 5/2018 |
| CN | 108141847 | A | 6/2018 |
| CN | 110024459 | A | 7/2019 |
| CN | 110351032 | A | 10/2019 |
| CN | 110545581 | A | 12/2019 |
| CN | 110740434 | A | 1/2020 |
| RU | 2713392 | C1 | 2/2020 |
| WO | 2019098772 | A1 | 5/2019 |
| WO | 2019237236 | A1 | 12/2019 |
| WO | 2020006955 | A1 | 1/2020 |
| WO | 2020025064 | A1 | 2/2020 |

OTHER PUBLICATIONS

First Office Action of the Canadian application No. 3152932, issued on Jun. 30, 2023, 4 pages.
MediaTek Inc., "Discussion on sidelink physical layer structure", 3GPP TSG RAN WG1 #99, 3GPP TSG RAN WG1 #99 R1-1912104, Reno, USA, Nov. 18-22, 2019, pp. 1-15.
Ericsson, "PHY layer structure for NR sidelink", 3GPP TSG RAN WG1#99, 3GPP TSG-RAN WG1 Meeting #99 R1-1912597, Reno, NV, US, Nov. 18-22, 2019, pp. 1-31.
First Office Action of the Korean application No. 10-2022-7009378, issued on Apr. 3, 2025, 11 pages with English translation.
First Office Action of the European application No. 23203124.5, issued on May 8, 2025, 7 pages.
MediaTek Inc., "Discussion on sidelink physical layer structure", 3GPP TSG RAN WG1 #100 R1-2000445, e-Meeting, Feb. 24-Mar. 6, 2020, pp. 1-11.
Spreadtrum Communications, "Discussion on physical layer structure for sidelink", 3GPP TSG RAN WG1 #99 R1-1912575, Reno, USA, Nov. 18-22, 2019, pp. 1-13.
Qualcomm Incorporated, "Synchronization Details for NR V2X", 3GPP TSG RAN WG1 #100-e, R1-2001198, Feb. 24-Mar. 6, 2020, pp. 1-10.
First Office Action of the Korean application No. 10-2022-7037381, issued on Jun. 10, 2025, 11 pages with English translation.
ITL. "Physical layer structure for NR V2X" 3GPP TSG RAN WG1 #99 R1-1912370, Nov. 22, 2019 (Nov. 22, 2019), 7 pages.
Fujitsu. "Discussion on mode 1 resource allocation for NR V2X" 3GPP TSG RAN WG1 #99 R1-1912078, Nov. 22, 2019 (Nov. 22, 2019), 6 pages.
International Search Report in the international application No. PCT/CN2020/074765, mailed on Nov. 6, 2020, 5 pages with English translation.
3GPP TSG RAN WG1 #99 R1-1912514, Reno, USA, Nov. 18-22, 2019, Title: NR sidelink physical layer structure, Source: ZTE, Sanechips, Agenda item: 7.2.4.1, Document for: Discussion and decision, 12 pages.
First Office Action of the Chinese application No. 202111176211.7, issued on Mar. 25, 2023, 14 pages with English translation.
Decision of Rejection of the Korean application No. 10-2022-7009378, issued on Dec. 8, 2025.
3GPP TSG RAN WG1 #100e-Meeting, Feb. 24-Mar. 6, 2020, R1-2000489, Source: OPPO, Title: Draft text proposals on physical layer structure for NR-V2X, Agenda Item: 7.2.4.1, Document for: Discussion and Decision, 16 pages.
3GPP TSG-RAN WG1 Meeting #100-e R1-2001015, e-Meeting, Feb. 24-Mar. 6, 2020, Agenda Item: 7.2.4.8, Source: Ericsson, Title: Remaining details on resource pool determination, Document for: Discussion, Decision, 3 pages.
International Search Report in the international application No. PCT/CN2020/083669, mailed on Dec. 30, 2020, 5 pages with English translation.
3GPP TSG RAN WG1 Meeting #100-e R1-2000183, Feb. 24-Mar. 6, 2020, Agenda Item: 7.2.4.2.2, Source: Huawei, HiSilicon, Title: Remaining details of sidelink resource allocation mode 2, Document for: Discussion and Decision, 14 pages.
3GPP TSG RAN WG1 Meeting #99 R1-1913465, Reno, USA, Nov. 18-22, 2019, Source: CATT, Title: Feature lead summary on AI 7.2.4.3 Sidelink synchronization mechanism, Agenda Item: 7.2.4.3, Document for: Discussion and Decision, 44 pages.
Vivo: "Remaining issues on sidelink synchronization mechanism", 3GPP Draft; R1-2000319, 3rd Generation Partnership Project (3GPP), Mobile Competence Centre; 650, Route Des Lucioles ; F-06921 Sophia-Antipolis Cedex ; France, RAN WG1, Feb. 14, 2020 (Feb. 14, 2020), XP051852808, 11 pages.
Huawei et al.: "Remaining details of sidelink synchronization mechanisms", 3GPP Draft; R1-2000185, 3rd Generation Partnership Project (3GPP), Mobile Competence Centre ; 650, Route Des Lucioles ; F-06921 SophiaAntipolis Cedex; France, RAN WG1, Feb. 15, 2020 (Feb. 15, 2020), 14 pages. XP051853181.
Supplementary European Search Report in European application No. 20930193.6, mailed on Oct. 19, 2022, 11 pages.
English translation of the Written Opinion of the International Search Authority in the international application No. PCT/CN2020/083669, mailed on Dec. 30, 2020, 7 pages with English translation.
Office Action of the Indian application No. 202217027688, issued on Nov. 16, 2022, 5 pages with English translation.
Notice of Allowance of the Russian application No. 2022123116, issued on Jun. 1, 2023. 25 pages with English translation, 25 pages with English translation.
First Office Action of the Chinese application No. 202210814268.3, issued on Aug. 4, 2023. 11 pages with English translation, 11 pages with English translation.
LG Electronics, "Discussion on physical layer structure for NR sidelink", 3GPP TSG RAN WG1 #100_e R1-2000781, Feb. 24-Mar. 6, 2020 the whole document, 32 pages.
First Office Action of the Japanese application No. 2022-552897, issued on Nov. 28, 2023, 8 pages with English translation.
Supplementary European Search Report in the European application No. 23203124.5, mailed on Dec. 14, 2023, 12 pages.
Hearing Notice of the Indian application No. 202217027688, issued on Jan. 19, 2024, 2 pages with English translation.
Non-Final Office Action of the U.S. Appl. No. 17/746,519, issued on Apr. 22, 2024, 38 pages.
Second Office Action of the Canadian application No. 3152932, issued on Apr. 3, 2024, 6 pages.
Fujitsu, "Other aspects on physical layer structure for NR sidelink", 3GPP TSG RAN WG1 #98bis, R1-1910140 Chongqing, China, Oct. 14-20, 2019, the whole document, 11 pages.
CATT, "Physical layer structure for NR sidelink", 3GPP TSG RAN WG1 Meeting #99, R1-1912153, Reno, USA, Nov. 18-22, 2019, the whole document, 22 pages.
"Evolved Universal Terrestrial Radio Access (E-UTRA); Physical layer procedures (Release 15)", 3GPP TS 36.213 V15.6.0, Section 14.1.5, 545 pages.
Notice of Rejection of the Japanese application No. 2022-517509, issued on Jul. 23, 2024, 11 pages with English translation.
First Office Action of the Vietnamese application No. 1-2022-01928, issued on Aug. 30, 2024, 3 pages with English translation.
First Office Action of the Vietnamese application No. 1-2022-05130, issued on Aug. 30, 2024, 4 pages with English translation.
Non-Final Office Action of the U.S. Appl. No. 17/675,139, issued on Apr. 19, 2024, 35 pages.
Notice of Allowance of the U.S. Appl. No. 17/675,139, issued on Jul. 26, 2024, 44 pages.
Notice of Allowance of the U.S. Appl. No. 17/746,519, issued on Jul. 31, 2024, 22 pages.

(56) References Cited

OTHER PUBLICATIONS

OPPO, "Draft text proposals on physical layer structure for NR-V2X", 3GPP TSG RAN WG1 #100bis, R1-2001745, e-Meeting, Apr. 20-30, 2020, the whole document, 11 pages.
OPPO, "Remaining issues of mode 1 resource allocation for NR-V2X", 3GPP TSG RAN WG1 #100, R1-2000490, e-Meeting, Feb. 24-Mar. 6, 2020, the whole document, 9 pages.
First Office Action of the Japanese application No. 2022-517509, issued on Jan. 26, 2024, 10 pages with English translation.
First Office Action of the European application No. 20918791.3, issued on Feb. 8, 2024, 11 pages.
Office Action of the Indian application No. 202217009578, issued on Sep. 15, 2022, 3 pages with English translation.
Written Opinion of the International Search Authority in the international application No. PCT/CN2020/074765, mailed on Nov. 6, 2020, 9 pages with English translation.
First Written Opinion of the Singaporean application No. 11202251395W, issued on Nov. 26, 2024, 9 pages.

* cited by examiner

Apparatus for determining a time domain resource

Determination unit 501

FIG. 5

METHOD AND APPARATUS FOR DETERMINING TIME DOMAIN RESOURCE, AND TERMINAL DEVICE

CROSS-REFERENCE TO RELATED APPLICATIONS

This is a continuation application of U.S. patent application Ser. No. 17/675,139 which is a continuation application of International Patent Application No. PCT/CN2020/074765 filed on Feb. 11, 2020, both of which are incorporated herein by reference in their entireties.

TECHNICAL FIELD

The embodiment of the disclosure relates to the technical field of mobile communication, in particular to a method and apparatus for determining a time domain resource and to a terminal device.

BACKGROUND

In a Long Term Evolution (LTE) Vehicle to Everything (V2X), a time unit configured by a resource pool is a subframe. As the subframe defined in the LTE V2X is different from that defined in a New Radio (NR) V2X, a resource pool configuration method in the LTE V2X may not be applied to the NR V2X. It is needed to define how to determine a resource pool configuration in the LTE V2X.

SUMMARY

The embodiments of the disclosure provide a method and apparatus for determining a time domain resource and a terminal device.

A method for determining a time domain resource provided by an embodiment of the present disclosure includes that: a terminal device determines a first time slot set in a first period, and the terminal device selects time slots from the first time slot set based on a first bitmap, the selected time slots forming the time domain resource of a resource pool.

An apparatus for determining a time domain resource provided by an embodiment of the disclosure, the apparatus including a determination unit. The determination unit is configured to determine a first time slot set in a first period and to select time slots from the first time slot set based on a first bitmap, the selected time slots forming the time domain resource of a resource pool.

The terminal device provided by an embodiment of the disclosure includes a processor and a memory. The memory is configured to store a computer program and the processor is configured to call and run the computer program stored in the memory to execute the method for determining a time domain resource.

A chip provided by an embodiment of the disclosure is configured to implement the method for determining a time domain resource.

Specifically, the chip includes a processor configured to call and run a computer program from a memory, such that a device provided with the chip can implement the method for determining a time domain resource.

A computer readable storage medium provided by an embodiment of the disclosure may store a computer program that enables a computer to execute the method for determining a time domain resource.

A computer program product provided by an embodiment of the disclosure includes a computer program instruction enabling a computer to execute the method for determining a time domain resource.

A computer program is provided by an embodiment of the disclosure, which, when running on a computer, executes the method for determining a time domain resource.

According to a technical scheme of the embodiments of the disclosure, in the NR V2X, a terminal device may determine a first time slot set in a first period, and the time slots in the first time slot set are time slots capable of configuring a resource pool. The terminal device may select time slots from the first time slot set based on a first bitmap. The selected time slots form the time domain resource of the resource pool. By adopting the technical scheme of the embodiments of the disclosure, the resource pool is configured by taking the time slots as time units, so that the time domain resource of the resource pool can be effectively and clearly determined, and the utilization ratio of resources can be improved.

BRIEF DESCRIPTION OF THE DRAWINGS

The drawings described herein for further understanding of the present disclosure consists a part of the disclosure. The schematic embodiments and description thereof are used for explaining the disclosure and do not limit the disclosure improperly. In the drawings.

FIG. 5 is a schematic diagram of a structural composition of an apparatus for determining a time domain resource according to an embodiment of the disclosure.

DETAILED DESCRIPTION

Description will be made on technical scheme in the embodiments of the disclosure below in combination with drawings in the embodiments of the disclosure. It is apparent that the described embodiments are a part of embodiments of the disclosure and are not all the embodiments. On a basis of the embodiments in the disclosure, all other embodiments obtained by those skilled in the technical field without creative efforts fall into the scope of protection of the disclosure.

The technical scheme of the embodiments of the disclosure may be applied to various communication systems, for example, an LTE system, an LTE Frequency Division Duplex (FDD) system, an LTE Time Division Duplex (TDD) system, a 5G communication system, a future communication system and the like.

Figure 1:
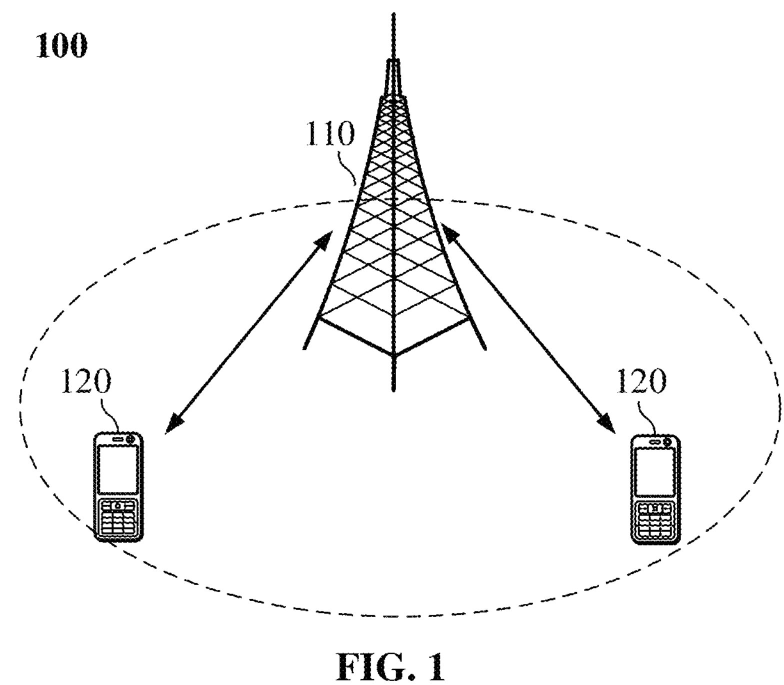
FIG. 1 is a schematic diagram of a structure of a communication system according to an embodiment of the disclosure.

For example, the communication system 100 applied in the embodiments of the disclosure is as shown in a FIG. 1.

The communication system 100 may include a network device 110 and the network device 110 may be a device communicated with a terminal 120 (or referred as to a communication terminal or a terminal). The network device 110 may provide communication coverage to a specific geographic area and may be communicated with a terminal located in the coverage area. Optionally, the network device 110 may be an evolutional node base station (Evolutional Node B, eNB or eNodeB) or a wireless controller in a cloud radio access network (CRAN), or the network equipment may be a mobile switching center, a relay station, an access point, a vehicle-mounted device, a wearable device, a concentrator, a switch, a network bridge, a router and a network side device in a 5G network or a network device in the future communication system and the like.

The communication system 100 may further include at least one terminal 120 located in the coverage range of the network device 110. The 'terminal' used here is connectable by a wire, for example, a Public Switched Telephone Network (PSTN), a Digital Subscriber Line (DSL), a digital cable and a direct cable; and/or another data connection/network; and/or a wireless interface, such as a cellular network, a Wireless Local Area Network (WLAN), a digital television network such as DVB-H, a satellite network and an AM-FM broadcast transmitter; and/or an apparatus of another terminal arranged to receive/transmit communication signals; and/or an Internet of things (IoT) device. The terminal arranged to communicate via a wireless interface may be referred as to a 'wireless communication terminal', a 'wireless terminal' or 'a mobile terminal'. An example of a mobile terminal includes, but not limited to, a satellite or a cell phone; a Personal Communications' Systems (PCS) terminal capable of combining a cellular radio phone and data processing, fax and data communication ability; a Personal Digital Assistant (PDA) capable of including the radio phone, a pager, Internet/Intranet accessing, a Web browser, a notepad, a calendar and/or a Global Positioning System (GPS) receiver; and a conventional laptop and/or palmtop receiver or another electronic device including a radio telephone transceiver. The terminal may refer to an accessing terminal, User Equipment (UE), a user unit, a user station, a mobile station, a mobile table, a remote station, a remote terminal, a mobile device, a user terminal, a terminal, a wireless communication device, a user agent or a user apparatus. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform Device to Device (D2D) communication.

Optionally, the 5G system or the 5G network may also be called an NR system or an NR network.

A network device and two terminal devices are exemplarily shown in FIG. 1. Optionally, the communication system 100 may include multiple network devices and another number of terminal devices in coverage of each network device. There are no limits made thereto in the embodiments of the disclosure.

Optionally, the communication system 100 may further include another network entity such as a network controller and a mobility management entity. There are no limits made thereto in the embodiments of the disclosure.

It is to be understood that a device with a communication function in a network/system in the embodiments of the disclosure may be called a communication device. For example, for the communication system 100 shown in FIG. 1, communication devices may include the network device 110 and terminal devices 120 with the communication function, and the network device 110 and the terminal devices 120 may be the specific devices mentioned above and will not be elaborated herein. The communication devices may further include other devices in the communication system 100, for example, other network entities like a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to understand the technical scheme in the embodiments of the disclosure conveniently, description on the technical scheme related to the embodiment of the disclosure is made below.

Resource Pool Configuration Method in LTE-V2X

In the LTE-V2X, a time domain source of a resource pool may be determined in a System Frame Number (SFN) period or a Direct Frame Number (DFN) period. Specifically, which time domain sources in the SFN period or the DFN period belong to the resource pool may be determined in the following manner.

An SFN period or a DFN period includes 10240 subframes which are subframes 0, 1, 2 to 10239. In the 10240 subframes, synchronous subframes, downlink subframes, special subframes (i.e., downlink subframes and special subframes in a TDD system) and reserved subframes are removed, residual subframes are re-numbered to form a subframe set $$(t_0^{SL}, t_1^{SL}, \ldots, t_{T_{max}}^{SL}).$$

The number of residual subframes may be divided evenly by $L_{bitmap}$ and $L_{bitmap}$ represents a length of a bitmap indicating configuration of the resource pool. The bitmap ($b_0$, $b_1, \ldots, b_{L_{bitmap}}$) indicating configuration of the resource pool may be periodically mapped to each residual subframe. A value of a bit is 1, representing that the subframe corresponding to the bit belongs to the resource pool. A value of a bit is 0, representing that the subframe corresponding to the bit does not belong to the resource pool.

Figure 2:
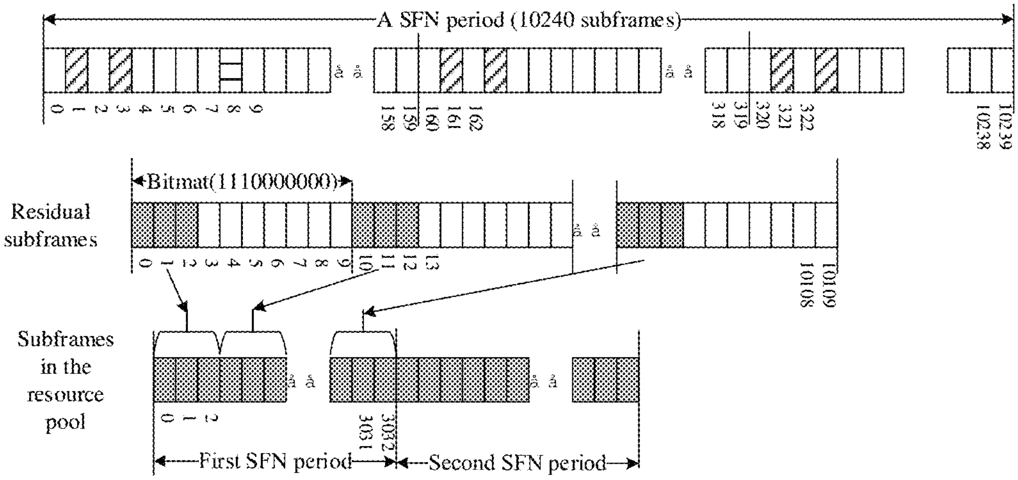
FIG. 2 is a schematic diagram I of configuring a resource pool according to an embodiment of the disclosure.

As show in FIG. 2, an SFN period or a DFN period includes 10240 subframes (10240 ms), a period of a synchronizing signal (a synchronizing period for short) is 160 ms, and one synchronizing period includes two synchronizing subframes, such that an SFN period has totally 128 synchronizing subframes. The length of the bitmap for indicating configuration of the resource pool is 10 bits ($L_{bitmap}$ is equal to 10), such that two reserved subframes are needed. The number of residual subframes is (10240–

128=10110), which can be divided evenly by the length 10 of the bitmap. The residual subframes are re-numbered as 0, 1, 2 to 10109, the front three bits in the bitmap are 1 and the rest bits are 0, that is, ($b_0$, $b_1$, . . . , $b_{L_{bitmap}}$) is equal to (1,1,1,0,0,0,0,0,0,0). It can be seen that in the residual subframes, the front three subframes in every 10 subframes belong to the resource pool and the rest subframes do not belong to the resource pool. As it is needed to repeat the bitmap for 1011 times in residual subframes to indicate whether all the subframes belong to the resource pool or not and three subframes in a period of each bitmap belong to the resource pool, totally 3033 subframes in one SFN period belong to the resource pool.

NR-V2X

In NR-V2X, it is needed to support automatic drive, therefore a higher demand is put on data interaction among vehicles, for example, higher throughput, lower latency, higher reliability, larger coverage, more flexible resource allocation and the like. Therefore, different from LTE V2X which mainly support periodical businesses, in NR V2X, it is needed to support periodical businesses and non-periodical businesses simultaneously. Further, the non-periodical businesses may take a main proportion. In addition, in order to reduce a data transmission latency and enhance flexibility of resource allocation, NR V2X need support different subcarrier spaces (SCS) and different time slot lengths. Specifically, in NR V2X, a SCS may be 15 kHz, 30 kHz, 60 kHz or 120 kHz while a time slot length may be 7-14 orthogonal frequency division multiplexing (OFDM) symbols. In LTE V2X, a SCS may be fixed at 15 kHz while a time slot length may be 14 Single-Carrier Frequency-Division Multiple Access (SC-FDMA) symbols.

In addition, in a resource pool of NR-V2X, a terminal device may reserve resources according to a certain period. Under this condition, the terminal device may reserve resources of one or more periods afterwards by means of sidelink control information (SCI) sent in the current period. The reserved reserve resources of one or more periods are configured to send different Transport Blocks (TB). In some resource pools, periodical reservation of resources is prohibited. Under this condition, the SCI sent by the terminal device may merely reserve resources for re-transmission of a same TB.

The resource pool in NR V2X may be configured via a parameter SL-ResourcePool, Information Element (IE) of the SL-ResourcePool is shown in table 1, and the IE is configured to determine the configuration information of the NR SideLink Resource pool (SL-ResourcePool).

TABLE 1

```
-- ASN1START
-- TAG-SL-RESOURCEPOOL-START
SL-ResourcePool-r16 ::=          SEQUENCE {
  sl-PSCCH-Config-r16              SetupRelease { SL-PSCCH-Config-r16 }
OPTIONAL, -- Need M
  sl-PSSCH-Config-r16              SetupRelease { SL-PSSCH-Config-r16 }
OPTIONAL, -- Need M
  sl-PSFCH-Config-r16              SetupRelease { SL-PSFCH-Config-r16 }
OPTIONAL, -- Need M
  sl-SyncAllowed-r16                     SL-SyncAllowed-r16
OPTIONAL, -- Need M
  sl-SubchannelSize-r16            ENUMERATED {n10, n15, n20, n25, n50, n75,
n100}      OPTIONAL, -- Need M
  sl-Period-r16                                                    (FFS)
OPTIONAL, -- Need M
  sl-TimeResource-r16                                              (FFS)
OPTIONAL, -- Need M
  sl-StartRB-Subchannel-r16                              INTEGER (0..265)
OPTIONAL, -- Need M
  sl-NumSubchannel-r16                                   INTEGER (1..27)
OPTIONAL, -- Need M
  sl-MCS-Table-r16                 ENUMERATED {qam64, qam256, qam64LowSE}
OPTIONAL, -- Need M
  sl-ThreshS-RSSI-CBR-r16                                INTEGER (0..45)
OPTIONAL, -- Need M
  sl-TimeWindowSizeCBR-r16             ENUMERATED {ms100, slot100}
OPTIONAL, -- Need M
  sl-TimeWindowSizeCR-r16              ENUMERATED {ms1000, slot1000}
OPTIONAL, -- Need M
  sl-PTRS-Config-r16                       SL-PTRS-Config-r16
OPTIONAL, -- Need M
  sl-ConfiguredGrantConfigList-r16     SL-ConfiguredGrantConfigList-r16
OPTIONAL, -- Need M
  sl-UE-SelectedConfigRP-r16             SL-UE-SelectedConfigRP-r16
OPTIONAL, -- Need M
  sl-RxParametersNcell-r16           SEQUENCE {
    sl-TDD-Config-r16                    TDD-UL-DL-ConfigCommon
OPTIONAL,
    sl-SyncConfigIndex-r16             INTEGER (0..15)
  }                                                      OPTIONAL, -
- Need M
  ...
}
SL-SyncAllowed-r16 ::=           SEQUENCE {
  gnss-Sync-r16                  ENUMERATED {true}        OPTIONAL,
-- Need R
  gnbEnb-Sync-r16                 ENUMERATED {true}        OPTIONAL,
-- Need R
```

TABLE 1-continued

```
  ue-Sync-r16                    ENUMERATED {true}          OPTIONAL
-- Need R
}
SL-PSCCH-Config-r16 ::=          SEQUENCE {
  sl-TimeResourcePSCCH-r16                    ENUMERATED {n2, n3}
OPTIONAL, -- Need M
  sl-FreqResourcePSCCH-r16                  ENUMERATED {n10,n12, n15, n20, n25}
OPTIONAL, -- Need M
  sl-DMRS-ScreambleID-r16                                  INTEGER (0..65535)
OPTIONAL, -- Need M
  sl-NumReservedBits-r16                                     INTEGER (2..4)
OPTIONAL, -- Need M
  ...
}
SL-PSSCH-Config-r16 ::=          SEQUENCE {
  sl-PSSCH-DMRS-TimePattern-r16                            SEQUENCE {FFS}
OPTIONAL, -- Need M
  sl-BetaOffsets2ndSCI-r16                 SEQUENCE (SIZE (4)) OF
SL-BetaOffsets-r16       OPTIONAL, -- Need M
  sl-Scaling-r16                             ENUMERATED {f0p5, f0p65, f0p8, f1}
OPTIONAL, -- Need M
  ...
}
SL-PSFCH-Config-r16 ::=          SEQUENCE {
  sl-PSFCH-Period-r16                          ENUMERATED {s10, s11, s12, s14}
OPTIONAL, -- Need M
  sl-PSFCH-RB-Set-r16                            BIT STRING (SIZE (275))
OPTIONAL, -- Need M
  sl-NumMuxCS-Pair-r16                       ENUMERATED {n1, n2, n3, n4, n6}
OPTIONAL, -- Need M
  sl-MinTimeGapPSFCH-r16                         ENUMERATED {s12, s13}
OPTIONAL, -- Need M
  sl-PSFCH-HopID-r16                                       INTEGER (0..1023)
OPTIONAL, -- Need M
  ...
}
SL-PTRS-Config-r16 ::=           SEQUENCE {
  sl-PTRS-FreqDensity-r16           SEQUENCE (SIZE (2)) OF INTEGER (1..276)
OPTIONAL, -- Need M
  sl-PTRS-TimeDensity-r16            SEQUENCE (SIZE (3)) OF INTEGER (0..29)
OPTIONAL, -- Need M
  sl-PTRS-RE-Offset-r16             ENUMERATED {offset01, offset10, offset11}
OPTIONAL, -- Need M
  ...
}
SL-UE-SelectedConfigRP-r16 ::=     SEQUENCE {
  sl-CBR-Priority-TxConfigList-r16          SL-CBR-Priority-TxConfigList-r16
OPTIONAL, -- Need M
  sl-ThresPSSCH-RSRP-List-r16                 SL-ThresPSSCH-RSRP-List-r16
OPTIONAL, -- Need M
  sl-MultiReserveResource-r16                 ENUMERATED {enabled}
OPTIONAL, -- Need M
  sl-MaxNumPerReserve-r16                       ENUMERATED {n2, n3}
OPTIONAL, -- Need M
  sl-SensingWindow-r16                        ENUMERATED {ms100, ms1100}
OPTIONAL, -- Need M
  sl-SelectionWindow-r16                    ENUMERATED {n1 , n5, n10, n20}
OPTIONAL, -- Need M
  sl-ResourceReservePeriodList-r16          SEQUENCE (SIZE (1..16)) OF SL-
ResourceReservePeriod-r16 OPTIONAL, -- Need M
  sl-RS-ForSensing-r16           ENUMERATED {pscch, pssch},
  ...
}
SL-ResourceReservePeriod-r16 ::=    ENUMERATED {s0, s100, s200, s300, s400,
s500, s600, s700, s800, s900, s1000}
SL-BetaOffsets-r16 ::=        INTEGER (0..31)
-- TAG-SL-RESOURCEPOOL-STOP
-- ASN1STOP
```

In LET V2X, the number of symbols available for sidelink transport in a subframe is smaller than 14, and in NR V2X, the number of symbols available for V2X transport may be smaller than 14. From this point of view, the resource pool configuration method of LTE V2X may not be applied to NR V2X. On the other hand, in LTE V2X, in order to ensure the number of subframes available for resource pool configuration in one SFN period or DFN period is integer multiples of a bitmap length indicating the resource pool configuration, a part of reserved subframes are not available for resource pool configuration, such that the utilization rate of resources is degraded. Therefore, a technical scheme is provided. In the technical scheme of the embodiments of the disclosure, when there are incomplete sidelink communication time slots in a SFN period or DFN period or there are sidelink resources reserved non-periodically, the time domain resources of the resource pool may be determined effectively and clearly, and the utilization ratio of the resources may be improved.

Figure 3:
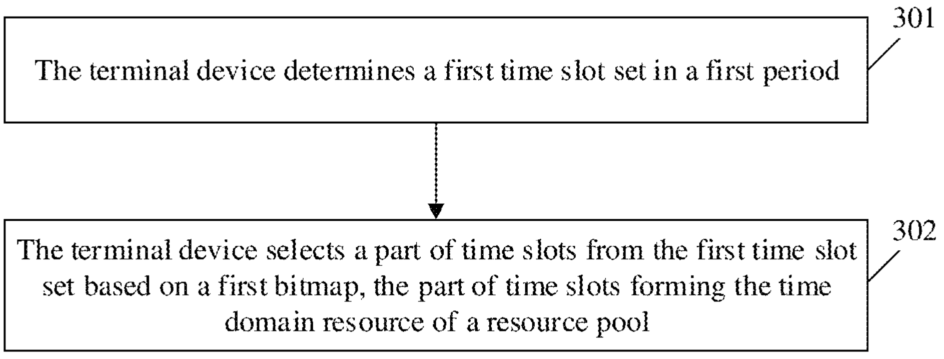
FIG. 3 is a flow schematic diagram of a method for determining a time domain resource according to an embodiment of the disclosure.

FIG. 3 is a flow schematic diagram of a method for determining a time domain resource according to an embodiment of the disclosure. As shown in FIG. 3, the method for determining a time domain resource includes the following steps.

At S301, a terminal device determines a first time slot set in a first period.

In the embodiment of the disclosure, the first time slot set may include a plurality of time slots. The first time slot set refers to a time slot set for resource pool configuration, i.e., the time slots in the first time slot set are time slots for resource pool configuration.

In the embodiment of the disclosure, the terminal device may determine the first time slot set in the first period. In an optional mode, the first period may be an SFN period. In another optional mode, the first period may be an DEN period.

In an optional mode of the disclosure, the terminal device may determine the first time slot set in the first period as follows:

$$t^{SL} = \{t_0^{SL}, t_1^{SL}, \ldots, t_{T_{max}}^{SL}\} \quad (1)$$

wherein $$0 \le t_i^{SL} < M \times 2^{\mu},$$

a value of M is the number of subframes in the first period and a value of μ is determined based on a subcarrier space on a BandWidth Part (BWP).

In the scheme, optionally, a value of M is 10240. Taking the SFN period as an example, one SFN period includes 1024 SFN and one SFN includes 10 subframes, such that one SFN period includes 10240 subframes.

In the scheme, optionally, a value of μ and a subcarrier space on the current BWP of the terminal device may have an associated relationship. Specifically, a corresponding relationship between a value of μ and a subcarrier space is shown in a table 2.

TABLE 2

| μ | $\Delta f = 2^{\mu} \cdot 15$ [kHz] |
|---|---|
| 0 | 15 |
| 1 | 30 |
| 2 | 60 |
| 3 | 120 |
| 4 | 240 |

Δf represents a subcarrier space, the unit of which is kHz.

Further, an index of a time slot in the scheme is numbered relative to an index of the first time slot set in SFN #0 or DFN #0.

In the embodiment of the disclosure, there may be two implementation modes for the first time slot set, and the two implementation modes are described below.

Mode 1-1: the first time slot set includes all time slots other than following time slots in the first period:

a first type of time slots, configured to send an S-SSB;

a second type of time slots, at least one of N continuous symbols started from the $m^{th}$ symbol in the second type of time slots being not an uplink symbol, N being positive integers, and m being greater than or equal to 0 but smaller than 13; and a third type of time slots, the third type of time slots being reserved time slots.

Further, explanation on the first type of time slots is made below: when a time slot is configured to send an S-SSB, the time slot belongs to the first type of time slots. The number of the first type of time slots included in the first period is marked as $N_{S\text{-}SSB}$.

Further, explanation on the second type of time slots is made below: when at least one of a downlink symbol, a flexible symbol and an uplink symbol is configured in a time slot and at least one symbol in N continuous symbols starting from a $m^{th}$ symbol in the time slot is not an uplink symbol (i.e., not all the N continuous symbols are uplink symbols), the time slot belongs to the second type of time slots. Optionally, the second type of time slots may be also referred as to incomplete uplink time slots. m and N are values configured or pre-configured for a current BWP. The number of the second type of time slots included in the first period is marked as $N_{df}$.

It is noted that the symbols herein refer to OFDM symbols in a time domain.

Further, explanation on the third type of time slots is made below: the third type of time slots refers to reserved time slots, and the third type of time slots (i.e., the reserved time slots) may be determined in the following manner: all time slots other than the first and second types of time slots in the first period form a second time slot set:

$$\{l_0, l_1, \ldots, l_{M\times 2^{\mu}-N_{S-SSB}-N_{df}}\} \quad (2)$$

The time slots in the second time slot set may be arranged from small to large based on a time slot index; $N_{S\text{-}SSB}$ refers to the number of the first type of time slots in the first period and $N_{df}$ refers to the number of the second type of time slots in the first period;

When $$r = \left\lfloor \frac{n \cdot (M \times 2^{\mu} - N_{S-SSB} - N_{df})}{N_{reserved}} \right\rfloor,$$

time slots $l_r$ in the second time slot set are the third type of time slots; where $0 \le r < M\times 2^{\mu} - N_{S\text{-}SSB} - N_{df}$, $N_{reserved} = M\times 2^{\mu} - N_{S\text{-}SSB} - N_{df} \bmod L_{bitmap}$, the $L_{bitmap}$ represents a length of the first bitmap.

Further, optionally, the terminal device may determine a value of $L_{bitmap}$ based on network configuration signaling or pre-configured signaling (i.e., the length of the first bitmap).

Mode 1-2: the first time slot set includes all time slots other than following time slots in the first period:

a first type of time slots, configured to send the S-SSB; and a second type of time slots, at least one of N continuous symbols started from the $m^{th}$ symbol in the second type of time slots being not an uplink symbol, N being positive integers, and m being greater than or equal to 0 but smaller than 13.

Here, explanation on the first and second types of time slots may be understood with reference to above description.

In the embodiments of the disclosure, when the N continuous symbols started from the $m^{th}$ symbol in a time slot are uplink symbols or sidelink symbols, the time slot may be configured as a time slot in the resource pool.

S302: the terminal device selects a part of time slots from the first time slot set based on a first bitmap, the part of time slots forming the time domain resource of a resource pool.

In the embodiment of the disclosure, the terminal device may select time slots from the first time slot set based on a first bitmap, the first bitmap is configured to indicate a time domain configuration of the resource pool and the length of the first bitmap is marked as $L_{bitmap}$. Further, optionally, the terminal device may determine a value of $L_{bitmap}$ based on network configuration signaling or pre-configured signaling. The selected time slots form the time domain resource of a resource pool.

In the embodiment of the disclosure, there may be two implementation modes of selecting part of time slots (i.e., determining which time slots in the first time slot set belong to the time slots of the resource pool the first time slot set), and the two implementation modes are described below.

Mode 2-1

For a condition that the first time slot set is determined in the model 1-1, the terminal device may determine a time slot $$t_k^{SL}$$

belonging to the resource pool based on the first bitmap $\{b_0, b_1, \ldots, b_{L_{bitmap}}\}$, $0 \le k < M \times 2^{\mu} - N_{S\text{-}SSB} - N_{df} - N_{reserved}$, k meeting $b_{k \bmod L_{bitmap}} = 1$.

$N_{S\text{-}SSB}$ refers to the number of the first type of time slots in the first period, $N_{df}$ refers to the number of the second type of time slots in the first period, $N_{reserved}$ refers to the number of the third type of time slots in the first period and $L_{bitmap}$ represents the length of the first bitmap.

In a specific implementation, the first bitmap may be periodically mapped to each time slot in the first time slot set. A value of a bit in the first bitmap being a first value represents that the time slot corresponding to the bit belongs to the resource pool, and a value of a bit in the first bitmap being a second value represents that the time slot corresponding to the bit does not belong to the resource pool. Further, optionally, the first value is 1 and the second value is 0.

For this mode, the number of the time slots in the first time slot set and the length of the first bitmap meet an integral multiple relationship. It is ensured that the number of time slots capable of being configured as the resource pool in the first period is integer multiples of the bitmap length indicating the resource pool configuration.

In this mode, it may be ensured that the time domain resource position of the resource pool in the first period is not needed to be kept unchanged relatively, which is favorable to support periodical data transmission.

Mode 2-2

For a condition that the first time slot set is determined in the model 1-2, the terminal device may determines a time slot $$t_k^{SL}$$

belonging to the resource pool based on the first bitmap $\{b_0, b_1, \ldots b_{L_{bitmap}}\}$, $0 \le k < M \times 2^{\mu} - N_{S\text{-}SSB} - N_{df}$, k meeting $b_{k \bmod L_{bitmap}} = 1$.

$N_{S\text{-}SSB}$ refers to the number of the first type of time slots in the first period, $N_{df}$ refers to the number of the second type of time slots in the first period and $L_{bitmap}$ represents the length of the first bitmap.

In a specific implementation, the first bitmap may be periodically mapped to each time slot in the first time slot set. A value of a bit in the first bitmap being a first value represents that the time slot corresponding to the bit belongs to the resource pool, and a value of a bit in the first bitmap being a second value represents that the time slot corresponding to the bit does not belong to the resource pool. Further, optionally, the first value is 1 and the second value is 0.

For this mode, the number of the time slots in the first time slot set and the length of the first bitmap may either meet an integral multiple relationship or not meet the integral multiple relationship. Further, under a condition that the number of the time slots in the first time slot set and the length of the first bitmap do not meet an integral multiple relationship, bitmap in the first bitmap exceeding the first time slot set is truncated after the first bitmap is mapped to the last time slot of the first time slot set.

Figure 4:
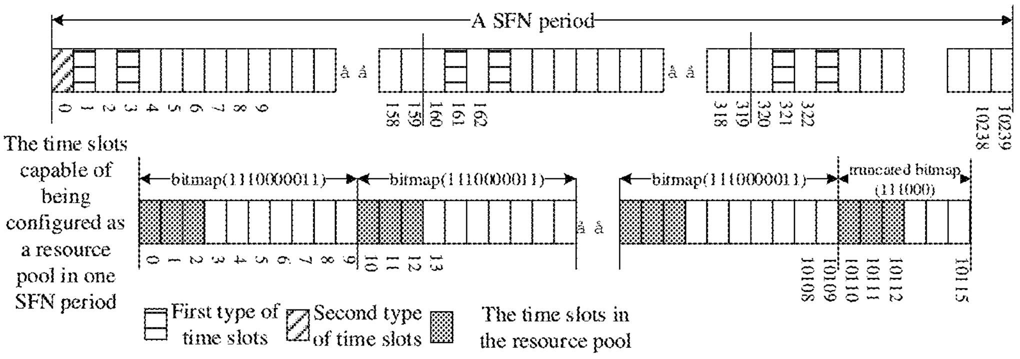
FIG. 4 is a schematic diagram II of configuring a resource pool according to an embodiment of the disclosure.

Referring to FIG. 4, by taking the first period as an SFN period as an example, one SFN period has 10240 time slots, time slots forming the first type of time slots (i.e., the time slots configured to send S-SSB) and/or the second type of time slots (i.e., the incomplete uplink time slots). After excluding the first type of time slots and the second type of time slots from the 10240 time slots, the number of the time slots capable of being configured as the resource pool is 10116 and the length of the bitmap for resource pool configuration is 10, such that there are 4 bits in the bitmap exceed one SFN period finally, and thus, the 4 bits are truncated, and the time slot positions of the resource pool may be determined via the truncated bitmap.

In this way, in resource pool configuration, extra reserved time slots may be avoided, such that the utilization ratio of resources may be improved.

In an optional mode of the disclosure, for a to-be-determined resource pool, when the periodical resource is reserved and configured as an enabled state, the time domain resource of the resource pool may be determined according to the mode 1-1 combined with the mode 1-2. When the periodical resource is reserved and configured as a deactivated state, the time domain resource of the resource pool may be determined according to the mode 2-1 combined with the mode 2-2.

For example, the terminal device may determine a first configuration parameter corresponding to the resource pool. Values in the first configuration parameter may be configured to determine a resource reservation period, and the first configuration parameter includes at least one value that is not zero. And/or, the terminal device may determine a second configuration parameter corresponding to the resource pool, the second configuration parameter being arranged in a deactivated state and the deactivated state indicating that the terminal device is not capable of reserving a resource for initial transportation of another TB by scheduling SCI of a TB. For the configuration parameters, the terminal device may determine the time domain resource of the resource pool according to the mode 1-1 combined with the mode 1-2. Here, the first configuration parameter, for example, may be sl-ResourceReservePeriodList.

For example, the terminal device may determine a first configuration parameter corresponding to the resource pool, values in the first configuration parameter being configured to determine a resource reservation period and the first configuration parameter including values that are zero. And/or, the terminal device may determine a second configuration parameter corresponding to the resource pool, the second configuration parameter being arranged in a deactivated state and the deactivated state indicating that the terminal device is not capable of reserving a resource for initial transportation of another TB by scheduling SCI of a TB. For these configuration parameters, the terminal device may determine the time domain resource of the resource pool according to the mode 2-1 combined with the mode 2-2. Here, the second configuration parameter, for example, may be sl-MultiReserveResource.

For example, when the configuration parameter sl-ResourceReservePeriodList corresponding to the to-be-determined resource pool by the terminal device includes values that are not zero, it indicates that the terminal device may reserve resources in the resource pool according to a period indicted by the sl-ResourceReservePeriodList. Under this circumstance, the terminal device may determine the time domain resource of the resource pool according to the mode 1-1 combined with the mode 1-2. On the contrary, the terminal device may determine the time domain resource of the resource pool according to the mode 2-1 combined with the mode 2-2.

For example, when a configuration parameter sl-MultiReserveResource corresponding to a resource pool to be determined is set by the terminal device as "enabled", it indicates that in the resource pool, the terminal device may reserve resources for another TB initial transmission, and under this circumstance, the terminal device may determine the time domain resource of the resource pool according to the mode 1-1 combined with the mode 1-2. On the contrary, the terminal device may determine the time domain resource of the resource pool according to the mode 2-1 combined with the mode 2-2.

In this mode, it may be ensured that the time domain resource position of the resource pool in the first period is not needed to be kept unchanged relatively, which is favorable for periodical data transmission. For the resource pools that do not support reservation of periodical resources, extra reserved time slots may be avoided in resource pool configurations, such that the utilization ratio of resources may be improved.

It is noted that for the mode 1-1, when an SCI scheduling one TB transmission indicates reservation of resources of different TBs, part of reserved time slots may be unavailable for resource pool configuration to ensure that the number of the time slots capable of being configured as the resource pool in the first period is integer multiples of the length of the bitmap indicating the resource pool configuration. For the mode 1-2, if an SCI scheduling one TB transmission cannot indicate reservation of resources of different TBs, part of reserved time slots may be used for resource pool configuration. Further, if the number of the time slots capable of being configured as the resource pool in the first period is not integer multiples of the length of the bitmap indicating the resource pool configuration, the bitmap exceeding the first period is truncated after the bitmap for resource pool configuration is mapped to the last time slot of the first period.

According to the technical scheme of the embodiment of the disclosure, when there are incomplete uplink time slots in NR V2X or there are sidelink transmission reserved non-periodically, the time domain resources of the resource pool may be determined effectively and clearly, and the utilization ratio of the resources may be improved.

Figure 5:
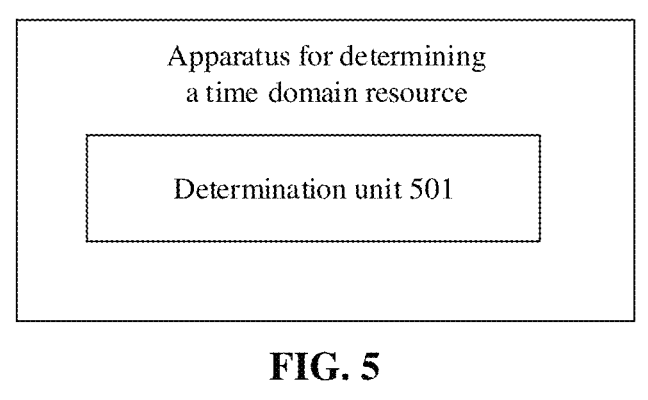

FIG. 5 is a schematic diagram of structural composition of an apparatus for determining a time domain resource provided by an embodiment of the disclosure. As shown in FIG. 5, the apparatus for determining a time domain resource includes a determination unit 501.

The determination unit 501 is configured to determine a first time slot set in a first period and to select time slots from the first time slot set based on a first bitmap, the part of time slots forming the time domain resource of a resource pool.

In an optional mode, the determination unit 501 is configured to determine the first time slot set in the first period as follows:

$$t^{SL} = \{t_0^{SL}, t_1^{SL}, \ldots, t_{T_{max}}^{SL}\};$$

wherein $$0 \le t_i^{SL} < M \times 2^{\mu},$$

a value of M is the number of subframes in the first period and a value of μ is determined based on a subcarrier space on a BWP.

In an optional mode, the first time slot set may include all time slots other than following time slots in the first period:

- a first type of time slots, configured to send a sidelink synchronizing signal block S-SSB;
- a second type of time slots, at least one of N continuous symbols started from the $m^{th}$ symbol in the second type of time slots being not an uplink symbol, N being positive integers, and m being greater than or equal to 0 but smaller than 13; and
- a third type of time slots, the third type of time slots being reserved time slots.

In an optional mode, all time slots other than the first and second types of time slots in the first period may form a second time slot set:

$$\{l_0, l_1, \ldots, l_{M\times 2^{\mu}-N_{S-SSB}-N_{df}}\}$$

wherein $N_{S\text{-}SSB}$ refers to the number of the first type of time slots in the first period and $N_{df}$ refers to the number of the second type of time slots in the first period;

When $$r = \left\lfloor \frac{n \cdot (M \times 2^{\mu} - N_{S-SSB} - N_{df})}{N_{reserved}} \right\rfloor,$$

the time slots $l_r$ in the second time slot set are the third type of time slots;

wherein $0 \le r < M\times 2^{\mu} - N_{S\text{-}SSB} - N_{df}$, $N_{reserved} = M\times 2^{\mu} - N_{S\text{-}SSB} - N_{df} \bmod L_{bitmap}$, the $L_{bitmap}$ represents a length of the first bitmap.

In an optional mode, the first bitmap is configured to indicate a time domain configuration of the resource pool.

The determination unit 501 is configured to determine the time slot $t_k^{SL}$ belonging to the resource pool based on the first bitmap $\{b_0, b_1, \ldots, b_{L_{bitmap}}\}$, $0 \le k < M \times 2^{\mu} - N_{S\text{-}SSB} - N_{df} - N_{reserved}$, k meeting $b_{k \bmod L_{bitmap}} = 1$;

where $N_{S\text{-}SSB}$ refers to the number of the first type of time slots in the first period, $N_{df}$ refers to the number of the second type of time slots in the first period, $N_{reserved}$ refers to the number of the third type of time slots in the first period and $L_{bitmap}$ represents the length of the first bitmap.

In an optional mode, the first bitmap may be periodically mapped to each time slot in the first time slot set. A value of a bit in the first bitmap being a first value represents that the time slot corresponding to the bit belongs to the resource pool, and a value of a bit in the first bitmap being a second value represents that the time slot corresponding to the bit does not belong to the resource.

The number of the time slots in the first time slot set and the length of the first bitmap meet an integral multiple relationship.

In an optional mode, the determination unit 501 is further configured to determine a first configuration parameter corresponding to the resource pool, values in the first configuration parameter being configured to determine a resource reservation period and the first configuration parameter including at least one value that is not zero; and/or determine a second configuration parameter corresponding to the resource pool, the second configuration parameter being arranged in a deactivated state and the deactivated state indicating that the terminal device is not capable of reserving a resource for initial transportation of another TB by scheduling SCI of a TB.

In an optional mode, the first time slot set may include all time slots other than following time slots in the first period:

a first type of time slots, configured to send the S-SSB; and a second type of time slots, at least one of N continuous symbols started from the $m^{th}$ symbol in the second type of time slots being not an uplink symbol, N being positive integers, and m being greater than or equal to 0 but smaller than 13.

In an optional mode, the first bitmap is configured to indicate a time domain configuration of the resource pool.

The determination unit 501 is configured to determine the time slot $t_k^{SL}$ belonging to the resource pool based on the first bitmap $\{b_0, b_1, \ldots, b_{L_{bitmap}}\}$, $0 \le k < M \times 2^{\mu} - N_{S\text{-}SSB} - N_{df}$, k meeting $b_{k \bmod L_{bitmap}} = 1$;

where $N_{S\text{-}SSB}$ refers to the number of the first type of time slots in the first period and $N_{df}$ refers to the number of the second type of time slots in the first period.

In an optional mode, the first bitmap may be periodically mapped to each time slot in the first time slot set. A value of a bit in the first bitmap being a first value represents that the time slot corresponding to the bit belongs to the resource pool, and a value of a bit in the first bitmap being a second value represents that the time slot corresponding to the bit does not belong to the resource.

Under a condition that the number of the time slots in the first time slot set and the length of the first bitmap do not meet an integral multiple relationship, bitmap in the first bitmap exceeding the first time slot set may be truncated after the first bitmap is mapped to the last time slot of the first time slot set.

In an optional mode, the determination unit 501 is further configured to determine a first configuration parameter corresponding to the resource pool, values in the first configuration parameter being configured to determine a resource reservation period and the first configuration parameter including values that are zero; and/or a determine a second configuration parameter corresponding to the resource pool, the second configuration parameter being arranged in a deactivated state and the disabled state indicating that the terminal device can reserve a resource for initial transportation of another TB by scheduling SCI of a TB.

In an optional mode, a value of the M may be 10240.

In an optional mode, the first period may be an SFN period or a DFN period.

Those skilled in the art shall understand that related description of the apparatus for determining a time domain source in the embodiment of the disclosure can be understood with reference to related description of the method for determining a time domain source in the embodiment of the disclosure.

Figure 6:
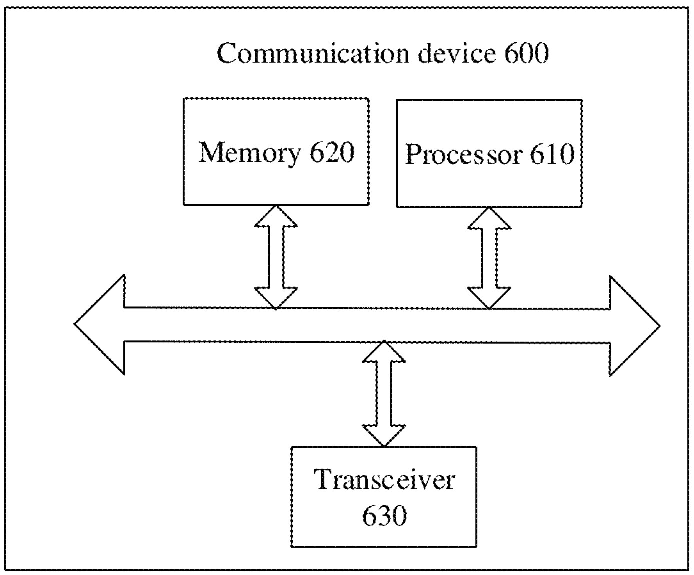
FIG. 6 is a structural schematic diagram of a communication device according to an embodiment of the disclosure.

FIG. 6 is a structural schematic diagram of a communication device 600 provided by the embodiment of the disclosure. The communication device may be either the terminal device or the network device. The communication device 600 shown in FIG. 6 includes a processor 601, and the processor 601 may call and run the computer program from the memory to implement the method in the embodiment of the disclosure.

Optionally, as shown in FIG. 6, the communication device 600 may further include a memory 620. The processor 601 may call and run the computer program from the memory 620 to implement the method in the embodiment of the disclosure.

The memory 620 either may be an independent apparatus independent from the processor 610 or may be integrated in the processor 610.

Optionally, as shown in FIG. 6, the communication device 600 may further include a transceiver 630, and the processor 610 may control the transceiver 630 to communicate with another device, specifically sending information or data to the other device or receiving information or data sent by the other device.

The transceiver 630 may include a transmitter and a receiver. The transceiver 530 may further include antennae, and the number of the antennae may be one or more.

Optionally, the communication device 600 may specifically be a network device of the embodiment of the disclosure, and the communication device 600 may implement corresponding flows implemented by the network device in each method of the embodiments of the disclosure. For simplicity, elaborations are omitted herein.

Optionally, the communication device 600 may specifically be a terminal device or network device of the embodiment of the disclosure, and the communication device 600 may implement corresponding flows implemented by the mobile terminal/terminal device in each method of the embodiments of the disclosure. For simplicity, elaborations are omitted herein.

Figure 7:
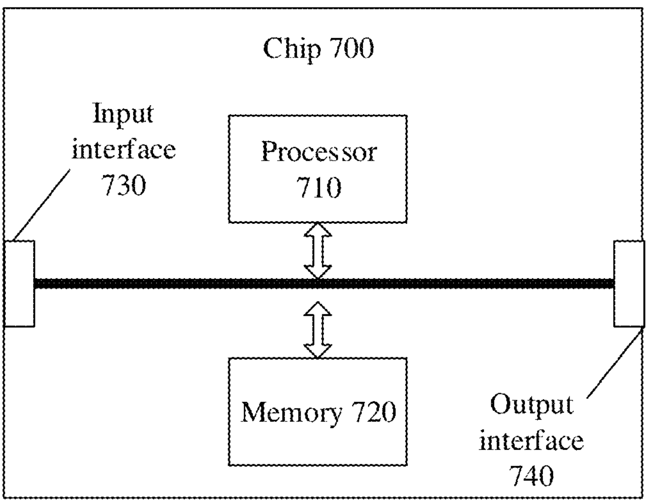
FIG. 7 is a structural schematic diagram of a chip according to an embodiment of the disclosure.

FIG. 7 is a structural schematic diagram of a chip provided by an embodiment of the disclosure. The chip 700 shown in FIG. 7 includes a processor 710, and the processor 710 may call and run a computer program in a memory to implement the method in the embodiments of the disclosure.

Optionally, as shown in FIG. 7, the chip 700 may further include the memory 720. The processor 710 may transfer and run the computer program from the memory 720 to implement the method in the embodiment of the disclosure.

The memory 720 either may be an independent apparatus independent from the processor 710 or may be integrated in the processor 710.

Optionally, the chip 700 may further include an input interface 730. The processor 710 may control the input interface 730 to communicate with another device or chip, specifically acquiring information or data sent by the other device or chip.

Optionally, the chip 700 may further include an output interface 740. The processor 710 may control the output interface 740 to communicate with the other device or chip, specifically outputting information or data sent by the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the terminal device of the embodiments of the disclosure, and the chip may implement corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 8:
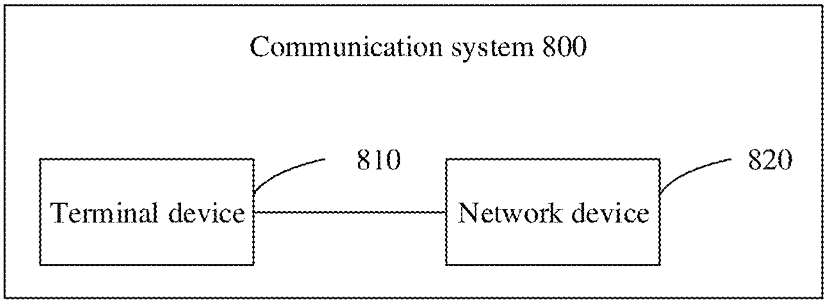
FIG. 8 is a schematic diagram of a communication system according to an embodiment of the disclosure.

FIG. 8 is a second block diagram of a communication system 800 according to an embodiment of the disclosure. As shown in FIG. 8, a communication system 800 includes a terminal device 810 and a network device 820.

The terminal device 810 may be configured to realize corresponding functions realized by the terminal device in the method, and the network device 820 may be configured to realize corresponding functions realized by the network device in the method. For simplicity, elaborations are omitted herein.

It is to be understood that the processor in the embodiment of the disclosure may be an integrated circuit chip and has a signal processing capability In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. he software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Execution of these functions by way of hardware or software is dependent on a specific disclosure and a design constraint condition of the technical scheme. Professionals can realize the described functions for each specific disclosure by using different methods, and the implementation shall not be considered to exceed the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining a time domain resource, comprising:

determining, by a terminal device, a first time slot set in a first period; and selecting, by the terminal device, time slots from the first time slot set based on a first bitmap, wherein the selected time slots form the time domain resource of a resource pool, wherein the first time slot set comprises all time slots other than following time slots in the first period:

a first type of time slots, configured to send a sidelink synchronizing signal block (S-SSB);

a second type of time slots, wherein at least one of N continuous symbols started from a $m^{th}$ symbol in the second type of time slots is not an uplink symbol, N being positive integers, and m being greater than or equal to 0 but smaller than 13; and a third type of time slots, the third type of time slots being reserved time slots.

2. The method according to claim 1, wherein the determining, by a terminal device, a first time slot set in a first period comprises:

determining, by the terminal device, the first time slot set in the first period as $$t^{SL} = \{t_0^{SL}, t_1^{SL}, \ldots, t_{T_{max}}^{SL}\}$$

wherein $$0 \le t_i^{SL} < M \times 2^{\mu},$$

a value of M is the number of subframes in the first period and a value of μ is determined based on a subcarrier space on a partial bandwidth part (BWP).

3. The method according to claim 1, wherein all time slots other than the first and second types of time slots in the first period form a second time slot set.

4. The method of claim 3, wherein the second time slot set is:

$$\{l_0, l_1, \ldots, l_{M\times 2^{\mu}-N_{S-SSB}-N_{df}}\}$$

wherein $N_{S-SSB}$ refers to the number of the first type of time slots in the first period, and $N_{df}$ refers to the number of the second type of time slots in the first period;

when $$r = \left\lfloor \frac{n \cdot (M \times 2^{\mu} - N_{S-SSB} - N_{df})}{N_{reserved}} \right\rfloor,$$

time slots $l_r$ in the second time slot set are the third type of time slots;

wherein $0 \le r < M \times 2^{\mu} - N_{S-SSB} - N_{df}$, $N_{reserved} = M \times 2^{\mu} - N_{S-SSB} - N_{df} \bmod L_{bitmap}$, the $L_{bitmap}$ represents a length of the first bitmap.

5. The method according to claim 1, wherein the first bitmap is configured to indicate a time domain configuration of the resource pool;

the selecting, by the terminal device, time slots from the first time slot set based on a first bitmap comprises:

determining, by the terminal device, time slot $$t_k^{SL}$$

belonging to the resource pool based on the first bitmap $\{b_0, b_1, \ldots, b_{L_{bitmap}}\}$, $0 \le k < M \times 2^{\mu} - N_{S-SSB} - N_{df} - N_{reserved}$, k meeting $b_{k \bmod L_{bitmap}} = 1$;

wherein $N_{S-SSB}$ refers to the number of the first type of time slots in the first period, $N_{df}$ refers to the number of the second type of time slots in the first period, $N_{reserved}$ refers to the number of the third type of time slots in the first period and $L_{bitmap}$ represents the length of the first bitmap.

6. The method according to claim 1, wherein the first bitmap is periodically mapped to each time slot in the first time slot set, wherein a value of a bit in the first bitmap being a first value represents that a time slot corresponding to the bit belongs to the resource pool, and a value of a bit in the first bitmap being a second value represents that a time slot corresponding to the bit does not belong to the resource pool; and the number of the time slots in the first time slot set and the length of the first bitmap meet an integral multiple relationship.

7. The method according to claim 1, further comprising at least one of followings:

determining, by the terminal device, a first configuration parameter corresponding to the resource pool, a value in the first configuration parameter being configured to determine a resource reservation period and the first configuration parameter comprising at least one value that is not zero; or, determining, by the terminal device, a second configuration parameter corresponding to the resource pool, the second configuration parameter being arranged in an enabled state and the enabled state indicating that the terminal device is capable of reserving a resource for initial transportation of another Transport Blocks (TB) by scheduling Sidelink Control Information (SCI) of a TB.

8. The method according to claim 2, wherein a value of M is 10240.

9. The method according to claim 1, wherein the first period is a System Frame Number (SFN) period or a Direct Frame Number (DFN) period.

10. An apparatus for determining a time domain resource, comprising:

a processor, configured to determine a first time slot set in a first period and to select time slots from the first time slot set based on a first bitmap, wherein the selected time slots form the time domain resource of a resource pool, wherein the first time slot set comprises all time slots other than following time slots in the first period:

a first type of time slots, configured to send a sidelink synchronizing signal block (S-SSB);

a second type of time slots, wherein at least one of N continuous symbols started from a $m^{th}$ symbol in the second type of time slots is not an uplink symbol, N being positive integers, and m being greater than or equal to 0 but smaller than 13; and a third type of time slots, the third type of time slots being reserved time slots.

11. The apparatus according to claim 10, wherein the processor is configured to determine the first time slot set in the first period as follows:

$$t^{SL} = \{t_0^{SL}, t_1^{SL}, \ldots, t_{T_{max}}^{SL}\}$$

wherein $$0 \le t_i^{SL} < M \times 2^{\mu},$$

a value of M is the number of subframes in the first period and a value of μ is determined based on a subcarrier space on a bandwidth Part (BWP).

12. The apparatus according to claim 10, wherein all time slots other than the first and second types of time slots in the first period form a second time slot set.

13. The apparatus according to claim 12, wherein the second time slot set is:

$$\{l_0, l_1, \ldots, l_{M \times 2^{\mu} - N_{S-SSB} - N_{df}}\}$$

wherein $N_{S-SSB}$ refers to the number of the first type of time slots in the first period, and $N_{df}$ refers to the number of the second type of time slots in the first period;

when $$r = \left\lfloor \frac{n \cdot (M \times 2^{\mu} - N_{S-SSB} - N_{df})}{N_{reserved}} \right\rfloor,$$

time slots $l_r$ in the second time slot set are the third type of time slots;

wherein $0 \le r < M \times 2^{\mu} - N_{S-SSB} - N_{df}$, $N_{reserved} = M \times 2^{\mu} - N_{S-SSB} - N_{df} \bmod L_{bitmap}$, the $L_{bitmap}$ represents a length of the first bitmap.

14. The apparatus according to claim 10, wherein the first bitmap is configured to indicate a time domain configuration of the resource pool;

the processor is configured to determine time slot $$t_k^{SL}$$

belonging to the resource pool based on the first bitmap $\{b_0, b_1, \ldots, b_{L_{bitmap}}\}$, $0 \leq k < M \times 2^{\mu} - N_{S\text{-}SSB} - N_{df} - N_{reserved}$, k meeting $b_{k \bmod L_{bitmap}} = 1$;

wherein $N_{S\text{-}SSB}$ refers to the number of the first type of time slots in the first period, $N_{df}$ refers to the number of the second type of time slots in the first period, $N_{reserved}$ refers to the number of the third type of time slots in the first period and $L_{bitmap}$ represents the length of the first bitmap.

15. The apparatus according to claim 10, wherein the first bitmap is periodically mapped to each time slot in the first time slot set, wherein a value of a bit in the first bitmap being a first value represents that a time slot corresponding to the bit belongs to the resource pool, and a value of a bit in the first bitmap being a second value represents that a time slot corresponding to the bit does not belong to the resource pool; and the number of the time slots in the first time slot set and the length of the first bitmap meet an integral multiple relationship.

16. The apparatus according to claim 11, wherein a value of M is 10240.

17. The apparatus according to claim 10, wherein the first period is a System Frame Number (SFN) period or a Direct Frame Number (DFN) period.

18. A non-transitory computer readable storage medium, storing a computer program enabling a computer to execute a method comprising:

determining a first time slot set in a first period; and selecting time slots from the first time slot set based on a first bitmap, wherein the selected time slots form the time domain resource of a resource pool, wherein the first time slot set comprises all time slots other than following time slots in the first period:

a first type of time slots, configured to send a sidelink synchronizing signal block (S-SSB);

a second type of time slots, wherein at least one of N continuous symbols started from a $m^{th}$ symbol in the second type of time slots is not an uplink symbol, N being positive integers, and m being greater than or equal to 0 but smaller than 13; and a third type of time slots, the third type of time slots being reserved time slots.

19. The non-transitory computer readable storage medium according to claim 18, wherein the first time slot set in the first period is determined as $$t^{SL} = \{t_0^{SL}, t_1^{SL}, \ldots, t_{T_{max}}^{SL}\}$$

wherein $$0 \leq t_i^{SL} < M \times 2^{\mu}$$

a value of M is the number of subframes in the first period and a value of μ is determined based on a subcarrier space on a partial bandwidth part (BWP).

20. The non-transitory computer readable storage medium according to claim 18, wherein all time slots other than the first and second types of time slots in the first period form a second time slot set.

* * * * *